United States Patent
Whitlow et al.

(10) Patent No.: US 9,547,929 B1
(45) Date of Patent: Jan. 17, 2017

(54) USER INTERFACE DEVICE FOR ADAPTIVE SYSTEMS

(75) Inventors: Stephen Whitlow, St. Louis Park, MN (US); Claudia Keinrath, Graz (AT); Michael Christian Dorneich, Saint Paul, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1303 days.

(21) Appl. No.: 13/093,490

(22) Filed: Apr. 25, 2011

(51) Int. Cl.
| | |
|---|---|
| *G06T 1/00* | (2006.01) |
| *G06T 15/00* | (2011.01) |
| *G06T 1/20* | (2006.01) |
| *G08G 5/00* | (2006.01) |
| *G06Q 10/06* | (2012.01) |
| *G09G 5/36* | (2006.01) |

(52) U.S. Cl.
CPC .............. *G06T 15/005* (2013.01); *G06T 1/20* (2013.01); *G08G 5/0026* (2013.01); *G06Q 10/06* (2013.01); *G08G 5/0082* (2013.01); *G09G 5/363* (2013.01)

(58) Field of Classification Search
None
See application file for complete search history.

(56) References Cited

U.S. PATENT DOCUMENTS

| | | | |
|---|---|---|---|
| 6,226,570 B1 | 5/2001 | Hahn | |
| 6,584,382 B2 | 6/2003 | Karem | |
| 7,624,943 B2 | 12/2009 | Cerchie et al. | |
| 7,693,624 B2 | 4/2010 | Duggan et al. | |
| 2003/0034901 A1 | 2/2003 | Griffin, III | |
| 2006/0066638 A1 | 3/2006 | Gyde et al. | |
| 2007/0032988 A1* | 2/2007 | Millette et al. | 702/184 |
| 2007/0067093 A1* | 3/2007 | Pepitone | 701/120 |
| 2007/0073575 A1* | 3/2007 | Yomogida | 705/9 |
| 2007/0290803 A1* | 12/2007 | Ayyagari et al. | 340/10.1 |
| 2008/0134082 A1* | 6/2008 | Delacroix et al. | 715/790 |
| 2008/0250348 A1* | 10/2008 | Alimpich et al. | 715/809 |
| 2009/0195820 A1* | 8/2009 | Sugimoto et al. | 358/1.15 |
| 2009/0320019 A1* | 12/2009 | Ellington et al. | 717/177 |
| 2010/0076628 A1 | 3/2010 | Boorman et al. | |
| 2010/0153875 A1* | 6/2010 | O'Flynn et al. | 715/786 |
| 2010/0161157 A1 | 6/2010 | Guilley et al. | |
| 2010/0262319 A1 | 10/2010 | Gunn et al. | |
| 2010/0332054 A1 | 12/2010 | Brandao et al. | |
| 2011/0160938 A1* | 6/2011 | Caillaud et al. | 701/3 |

* cited by examiner

*Primary Examiner* — Ulka Chauhan
*Assistant Examiner* — Saptarshi Mazumder
(74) *Attorney, Agent, or Firm* — Lorenz & Kopf, LLP

(57) ABSTRACT

A system for providing feedback regarding the division of automated and operator tasks is provided. The system includes a display device and a processor. The processor is configured to at least selectively supply image rendering display commands to the display device that cause the display device to simultaneously render an operator pane, an automation pane, and a shared pane. The operator pane displays one or more tasks that have been allocated for execution by a human operator, the automation pane displays one or more tasks that have been allocated for execution by automation, and the shared pane displays one or more tasks that have been allocated for execution by both automation and a human operator.

19 Claims, 2 Drawing Sheets

USER INTERFACE DEVICE FOR ADAPTIVE SYSTEMS

TECHNICAL FIELD

The present invention generally relates to adaptive systems, and more particularly relates to an adaptive system user interface device that provides feedback to a user regarding automation activities and plans.

BACKGROUND

Operators of complex systems, such as aircraft, are often faced with a challenging work environment where their task load varies between a very low level, during which they can become inattentive and drowsy, and a very high level, during which they can become overloaded and prone to poor performance. Vacillating between under-load and overload conditions can increase stress in operators, which can have potentially adverse consequences. Further, operators in these environments are often faced with frequent distractions.

The design goals for next generation air traffic management (ATM) include increasing system capacity by allowing pilots and airlines more responsibility to manage routes, aircraft separation, and to generally have more authority to make changes to the flight profile. However, pilots and airlines may also be responsible for flying more precise routes, planning further ahead, and coordinating with other aircraft to resolve potential conflicts. These changes may result in the need for more adaptive automation of the flight-deck to handle the increased complexity, precision, and flight crew responsibilities.

One of the challenges associated with adaptive automation systems is not only how real-time tasks should be divided between human operators and automation agents, but how operators may be informed of such task divisions. Currently configured display devices typically do not provide such feedback, and do not support shared task execution in a manner that explicitly displays the progress and automation contribution to an operator.

Hence, there is a need for a user interface device that provides explicit, dedicated feedback regarding the division of automated and operator tasks and/or supports shared task execution and/or displays the progress of operator, automatic, and shared tasks. The present invention addresses at least these needs.

BRIEF SUMMARY

In one embodiment, an adaptive system includes a display device and a processor. The display device is coupled to receive image rendering display commands and is configured, upon receipt thereof, to render images. The processor is in operable communication with the display device, and is configured to at least selectively supply image rendering display commands to the display device that cause the display device to simultaneously render an operator pane, an automation pane, and a shared pane. The operator pane displays one or more tasks that have been allocated for execution by a human operator, the automation pane displays one or more tasks that have been allocated for execution by automation, and the shared pane displays one or more tasks that have been allocated for execution by both automation and a human operator.

In another embodiment, an adaptive system includes a display device and a processor. The display device is coupled to receive image rendering display commands and is configured, upon receipt thereof, to render images. The processor is in operable communication with the display device, and is configured to at least selectively supply image rendering display commands to the display device that cause the display device to simultaneously render an operator pane, an automation pane, and a shared pane. The operator pane displays one or more tasks that have been allocated for execution by a human operator, the automation pane displays one or more tasks that have been allocated for execution by automation, and the shared pane is rendered between the operator pane and the automation pane and displays one or more tasks that have been allocated for execution by both automation and a human operator. The processor is further adapted to receive data representative of one or more of operator state, aircraft state, and aircraft mission, and is configured, upon receipt thereof, to adaptively and dynamically allocate various tasks to be displayed in the operator pane, the automation pane, and the shared pane.

In yet another embodiment, an adaptive system includes a display device and a processor. The display device is coupled to receive image rendering display commands and is configured, upon receipt thereof, to render images. The processor is in operable communication with the display device, and is configured to at least selectively supply image rendering display commands to the display device that cause the display device to simultaneously render an operator pane, an automation pane, and a shared pane. The operator pane displays one or more tasks that have been allocated for execution by a human operator, the automation pane displays one or more tasks that have been allocated for execution by automation, and the shared pane is rendered between the operator pane and the automation pane and displays one or more tasks that have been allocated for execution by both automation and a human operator. The processor is further adapted to receive data representative of one or more of operator state, aircraft state, and aircraft mission, and is configured, upon receipt thereof, to adaptively and dynamically allocate various tasks to be displayed in the operator pane, the automation pane, and the shared pane. Each of the one or more tasks that are displayed in the operator pane, the automation pane, and the shared pane are displayed in a predetermined order.

Furthermore, other desirable features and characteristics of the adaptive system will become apparent from the subsequent detailed description of the invention, taken in conjunction with the accompanying drawings and this background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In view of the foregoing, although embodiments of the systems and methods are described herein as being implemented in the context of an aircraft flight deck avionics system, it will be appreciated that this is merely exemplary of one particular end-use environment. The described systems and methods may be implemented in numerous and varied other end-use environments.

Figure 1:
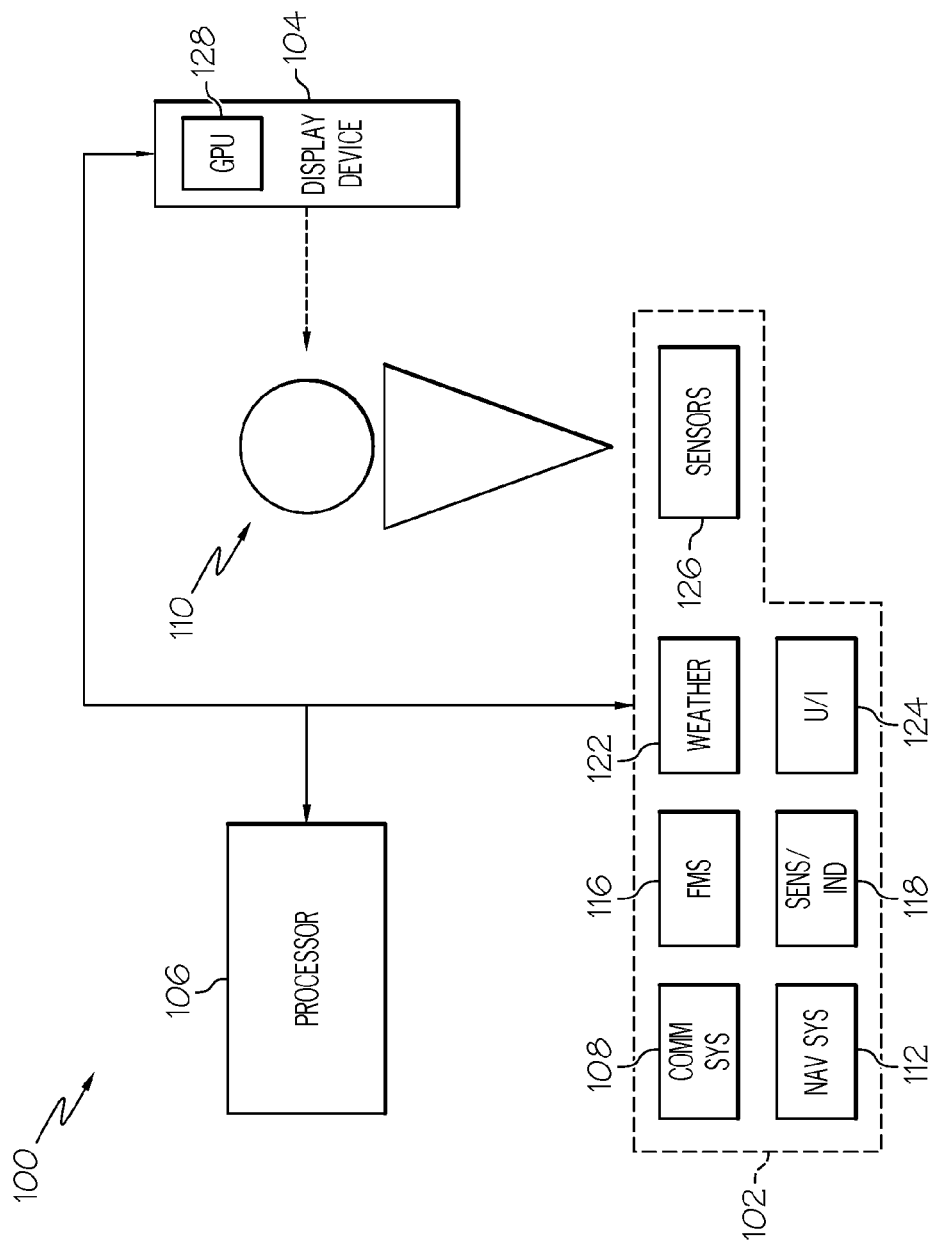
FIG. 1 depicts a functional block diagram of an example embodiment of at least a portion of an adaptive automation system.

Referring to FIG. 1, a functional block diagram of an example embodiment of at least a portion of an adaptive automation system 100 is depicted. The depicted system 100 includes at least a plurality of data sources 102, a display device 104, and a processor 106. The data sources 102 may vary in type and number, but in the depicted embodiment include various avionic systems. Some non-limiting examples of avionic systems that may comprise the data sources 102 include communication systems 108, navigation and guidance systems 112, flight management systems 116, sensors and indicators 118, weather systems 122, and various user interfaces 124 to assist a operator 110 in implementing control, monitoring, communication, and navigation functions of the aircraft.

As FIG. 1 further depicts, the data sources 102 may also include, at least in some embodiments, a plurality of user sensors 126. The user sensors 126, which may be variously implemented, are configured to sense and supply physiological data, contextual data, and/or various other relevant data to the processor 106. The user sensors 126 may be located on the body and/or clothing of the operator 110, and/or on one or more other devices (e.g., helmet, eye wear) worn by the operator 110. Alternatively, the user sensors 126 may be disposed nearby the operator 110.

It will be appreciated that the number and type of user sensors 126 may vary. Some non-limiting examples of suitable physiological sensors include an electroencephalogram (EEG) sensor, an electrocardiogram (ECG) sensor, an electro-oculogram (EOG) sensor, an impedance pneumogram (ZPG) sensor, a galvanic skin response (GSR) sensor, a blood volume pulse (BVP) sensor, a respiration sensor, an electromyogram (EMG) sensor, a pupilometry sensor, a visual scanning sensor, a blood oxygenation sensor, a blood pressure sensor, a skin and core body temperature sensor, a near-infrared optical brain imaging sensor, or any other device that can sense physiological changes in the pilot.

The EEG sensors monitor the user's brain wave activity by sensing electrical potential at the scalp. Measurements by the EEG sensors are categorized into frequency bands, including delta, theta, alpha, and beta. For example, the delta band ranging from 1-4 Hz indicates a state of unconsciousness, the theta band ranging from 4-8 Hz indicates a state of daydreaming, the alpha band ranging from 8-13 Hz indicates an alert, but not mentally busy state, and the beta band ranging from 13-30 Hz indicates a state of higher thought process. Other frequency bands are possible. Based on the location of the EEG sensors, and the dominant frequencies detected, EEG data may help evaluate the type and amount of mental activity of the operator 110. For example, if there are significant brain waves measured in the frontal brain, the operator 110 may be actively manipulating information within their working memory. As a result, the EEG sensors may be used to measure the cognitive state of the operator 110.

Other physiological sensors mentioned above include ECG sensors, EOG sensors, ZPG sensors, GSR sensors, pupilometry sensors, visual scanning sensors, blood oxygenation sensors, BVP sensors, EMG sensors, blood pressure sensors, and near-infrared optical brain imaging sensors. The ECG sensors measure heart rate by detecting electrical activity of the heart muscle. The EOG sensors measure eye movement by detecting electrical changes between the front and back of the eye as the eye moves. The ZPG sensors (or other type of respiration sensors) measure lung capacity and can be used to determine whether the operator 110 is having difficulty breathing. The GSR sensors measure changes in conductivity of the skin caused by sweating and saturation of skin ducts prior to sweating. The pupilometry sensors measure pupil dilation to determine the level of engagement or interest in a task, or cognitive load of a task. The visual scanning sensors measure scanning behavior and dwell time to provide insight into visual attention. The blood oxygenation sensors sense oxygen levels in the blood. The BVP sensors measure heart rate by detecting changes in blood volume at a given location of the body. The EMG sensors measure currents associated with muscle action. The near-infrared optical brain imaging sensors measure brain function.

The user sensors 126 may additionally include an accelerometer, an eye tracker, or any other device that can sense contextual data. The devices may be commercial off-the-shelf devices or custom designed. The accelerometers, if included, measure the rate at which an object is moving, the acoustic sensors, if included, measure the loudness and frequency of ambient sounds, and the eye trackers, if included, measure pupilometry and/or visual scanning behavior. Data from the accelerometers may be used to measure head movement such as yaw, pitch, and roll. Data from the eye trackers may be used to infer cognitive state from pupil dilation response and to infer visual attention indices from dwell time and scanning patterns.

The display device 104 is coupled to receive image rendering display commands from the processor 106 and is configured, in response to the commands, to display various images and data, in a graphic, iconic, and a textual format. It will be appreciated that the display device 104 may include a display processor 128, such as a graphics processing unit, to implement this function. It will additionally be appreciated that the functions of the display processor 128 may reside in, and thus be implemented by, processor 106. The display device 104 be implemented using any one of numerous known displays suitable for rendering graphic, iconic, and/or text data in a format viewable by the operator 110. Non-limiting examples of such displays include various cathode ray tube (CRT) displays, and various flat panel displays, such as various types of LCD (liquid crystal display), TFT (thin film transistor) displays, and OLED (organic light emitting diode) displays. The display device 104 may additionally be based on a panel mounted display, a HUD projection, or any known technology. In an exemplary embodiment, display device 104 includes a panel display. It is further noted that the system 100 could be implemented with numerous other display devices, in addition to the depicted display device 104.

The processor 106 is in operable communication with the data sources 102 and the display device 104. The processor 106 may be implemented using any one (or a plurality) of numerous known general-purpose microprocessors or application specific processor(s) that operates in response to program instructions. The processor 106 may be implemented using various other circuits, not just a programmable processor. For example, digital logic circuits and analog signal processing circuits could also be used. In this respect, the processor 106 may include or cooperate with any number of software programs (e.g., avionics display programs) or instructions designed to carry out various methods, process tasks, calculations, and control/display functions described below.

The processor 106 is configured, upon receipt of the sensor data supplied from the user sensors 126, to assess the workload and/or fatigue state of the operator 110. It will be appreciated that the user workload and/or fatigue states may be assessed using any one of numerous known methods. An example of one particular methodology is disclosed in U.S. Pat. No. 7,454,313, entitled "Hierarchical Workload Monitoring for Optimal Subordinate Tasking," which is assigned to the assignee of the instant application. It is noted that workload and/or fatigue states may also be assessed from secondary (i.e. non-direct) sources, such as tracking response times to stimuli (e.g. alerts) or performance on tasks. The processor 106 is additionally configured, upon receipt of data from the various other data sources 102, to determine, among other things, the state of the aircraft and the state of the aircraft mission.

The processor 106, based on one or more of the determined states of the operator 110, the aircraft, and the aircraft mission, adaptively and dynamically allocates various tasks to be performed by the operator 110 alone, by automation alone, or by both the operator 110 and automation. Based on these adaptive task allocations, the processor 106 at least selectively supplies image rendering display commands to the display device 104 that cause the display device 104 to render images representative of the task allocations. A particular representation of an image that may be rendered by the display device 104 is depicted in FIG. 2, and with reference thereto will now be described.

In the depicted embodiment, the image rendering display commands supplied from the processor 106 cause the display device 106 to simultaneously render an operator pane 202, an automation pane 204, and a shared pane 206. The operator pane 202 displays at least some of the tasks (if any) that have been allocated for execution by the operator 110, the automation pane 204 displays at least some of the tasks (if any) that have been allocated for execution by automation, and the shared pane 206 displays at least some of the tasks (if any) that have been allocated for execution by both automation and the operator 110. Although the relative positions, sizes, and configurations of the operator pane 202, automation pane 204, and shared pane 206 may vary, in the depicted embodiment, these panes 202-206 are rendered as adjacent columns, with the shared pane 206 being rendered between the operator pane 202 and the automation pane 204.

Figure 2:
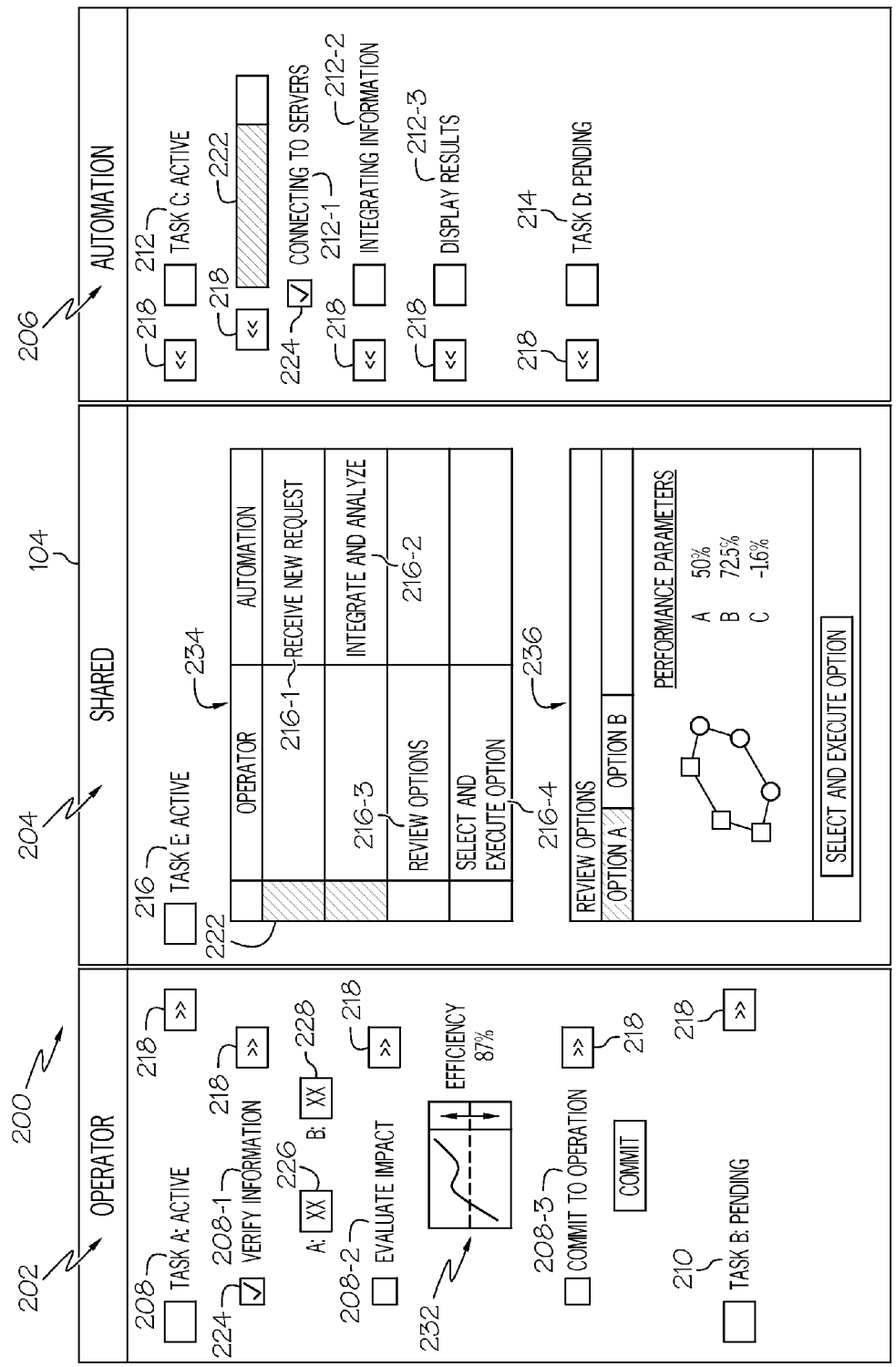
FIG. 2 depicts an example of an image that may be rendered by the display device of FIG. 1.

In the exemplary image depicted in FIG. 2, it is seen that at least two tasks have been allocated for execution by the operator 110, at least two tasks have been allocated for execution by automation, and one task has been allocated for execution by both automation and the operator 110. More specifically, "Task A" 208 and "Task B" 210 have been allocated for execution by the operator 110 and are rendered in the operator pane 202, "Task C" 212 and "Task D" 214 have been allocated for execution by automation and are rendered in the automation pane 204, and "Task E" 216 has been allocated for execution by both automation and the operator 110 and is rendered in the shared pane 206. It will be appreciated that the number of tasks allocated to each category (e.g., operator, automation, shared) may be more or less than the depicted number. It will additionally be appreciated that if the number of tasks allocated to each category does exceed the depicted number, the entire number of tasks in a particular category may or may not be rendered on the display device 104. In other words, in some embodiments only a subset of all of the tasks allocated to each category at any instant in time may be rendered.

No matter the specific number of tasks that are displayed in each pane 202-206, the system 100 is preferably configured so that each of the tasks 208-216 that are displayed in the operator pane 202, the automation pane 204, and the shared pane 206 are displayed in an order based on any one of numerous suitable schemes. For example, each task could be displayed in an order based on task priority, time-to-complete priority (e.g., task with least remaining time first), recency priority (most recent task first), or alphabetical order, just to name a few non-limiting examples. In some embodiments, plural order bases could be provided, and selectable by the operator 110. In the depicted embodiment, the order is a descending priority order from the top of each pane 202-206 to the bottom of each pane 202-206. Thus, in the depicted embodiment, "Task A" 208 has a higher priority than "Task B" 210, indicating to the operator 110 that he or she should execute "Task A" 208 before "Task V" 210. Similarly, "Task C" 212 has a higher priority than "Task D" 214 and, unless it is reallocated before it is executed, "Task C" 212 will be automatically executed before "Task D" 214.

At least some of the tasks 208-216 that are displayed in each pane 202-206 may have a plurality of associated sub-tasks. Preferably, all of the associated sub-tasks, at least for the tasks that are being executed, or are about to be executed, are also displayed. For example, in the depicted embodiment "Task A" 208 has three associated sub-tasks (208-1, 208-2, 208-3), "Task C" 212 has three associated sub-tasks (212-1, 212-2, 212-3), and "Task E" 216 has four associated sub-tasks (216-1, 216-2, 216-3, 216-4). Moreover, the shared pane 206 preferably and distinctively displays the sub-tasks that are (or will be) executed by automation (216-1, 216-2) and the sub-tasks that are (or will be) executed by the operator 110 (216-3, 216-4).

The depicted system 100 is additionally configured so that tasks and/or sub-tasks depicted in the operator pane 202 and the automation pane 204 may be selectively reallocated. In the depicted embodiment, this is implemented by selectively displaying one or more task transfer icons 218 in the operator pane 202 and the automation pane 204. The task transfer icon 218 may be variously rendered, but in the depicted embodiment it is depicted as a double-headed arrow icon that points toward the shared pane 206. Each task transfer icon 218, when rendered, is disposed at least proximate to a different one of the tasks and, if applicable, each associated sub-task, that are displayed in the associated operator pane 202 or automation pane 204. This provides the operator 110 with the option of reallocating a task or associated sub-task to a different execution category. For example, a task or associated sub-task that is currently allocated for operator execution may be reallocated for execution by automation or by both automation and the operator 110. Similarly, a task or associated sub-task that is currently allocated for execution by automation may be reallocated for execution by the operator 110 or by both automation and the operator 110.

The particular manner in which a task and/or sub-task may be reallocated may vary, but in the depicted embodiment, the operator 110 does so by selecting the particular task transfer icon 218 a predetermined number of times. So, for example, if the operator 110 wanted to reallocate "Task A" 208 (or just one or more of its associated subtasks) for execution by both automation and the operator 110 (e.g., shared), he or she would select the associated task transfer icon 218 once. Upon doing so, "Task A" (or just the one or more associated subtasks) would then be displayed in the shared pane 206. If, however, the operator 110 wanted to reallocate "Task A" 208 (or just one or more of its associated subtasks) for execution by automation, he or she would select the associated task transfer icon 218 twice. Upon doing so, "Task A" (or just the one or more associated subtasks) would then be displayed in the automation pane 204. It will be appreciated that, at least in some embodiments, once a particular task or sub-task has begun, it may no longer be reallocated. In other embodiments, the system 100 may be configured to allow the operator 110 to intervene and reallocate, as needed or desired. For example, if the operator 110 wanted automaton to finish a particular task. However, in the depicted embodiment, to indicate its unavailability for reallocation, a particular characteristic of the associated task transfer icon 218 may be varied. For example, it may be changed to a different color, a different size, or become transparent, just to name a few. It will be appreciated that, at least in some embodiments, sub-tasks that have not begun being executed remain available for reallocation.

Before proceeding further it is noted that in other embodiments, task and/or sub-task reallocation may be implemented using other techniques. For example, the system 100 may be configured to implement this function using dialog boxes, via speech recognition, or any one of numerous other techniques.

The system 100 may additionally be configured so that the operator pane 202, the automation pane 204, and the shared pane 206 display information representative of the status of each of the tasks 208-216. This may include information representative of the tasks 208-216 that are currently being executed, information representative the tasks 208-216 that are currently pending, and information representative the tasks 208-216 that have been completed. The specific manner in which this information is presented may vary. For example, in the depicted embodiment, the information representative of the tasks 208-216 that are currently being executed and those that are currently pending is textual information. Hence, in FIG. 2 it may be seen that "Task A" 208, "Task C" 212, and "Task E" 216 are currently being executed, and are labeled with the word "Active." Moreover, "Task B" 210 and "Task D" 218 are pending, and are labeled with the word "Pending."

The system 100 may also be configured so that the operator pane 202, the automation pane 204, and the shared pane 206 may selectively display a progress indicator. The progress indicator 222, if displayed, provides feedback regarding the progress of task (or sub-task) completion. The specific manner in which the progress indicator 222 is displayed may vary, but in the depicted embodiment the progress indicator is displayed as a progress bar. Thus, in the depicted embodiment, it is seen that the first sub-task of "Task C" 212 is about 85% complete, and both of the automation sub-tasks 216-1, 216-2 of "Task E" 216 are fully complete. In addition, when a sub-task is being executed or has been completed, a completion icon 224 may also be displayed adjacent the associated sub-task. The specific manner in which the completion icon 224 is displayed may vary, but in the depicted embodiment it is displayed as a checkmark. Thus, in the depicted embodiment, the first sub-task 208-1 of "Task 1" 208 has been completed, and the first sub-task 212-2 of "Task 3" 212 is being completed.

In addition to the above, the system 100 may be configured to display specific types of information in only one or more of the panes 202-206. In the depicted embodiment, the system 100 is configured to allow operator interaction with various tasks and/or sub-tasks displayed in the operator pane 202. For example, the operator pane 202 may additionally display one or more parameters associated with a completed task or sub-tasks. The operator pane 202 may additionally (or instead) display one or more user-interactive fields 226, 228 and/or one or more sets of informational data 232 adjacent one or more of the tasks and/or sub-tasks. The user-interactive fields 226, 228 and sets of informational data 232 may be displayed automatically in the operator pane 202, or may be displayed via one or more linked-to dialog boxes. The outcome of a particular sub-task may also be displayed, in these user-interactive fields 226, 228, upon completion of the associated task or sub-task.

The system 100 may be configured such that the shared pane 206 displays how the operator 110 and automation share sub-task responsibilities. In the depicted embodiment this is done via a table 234, which depicts the sub-tasks that have been or will be executed by automation, and those that have been or will be executed by the operator 110. In this embodiment, the progress indicator 222 is displayed as a bar along the left margin of the table 234, and provides progress feedback as the operator 110 and automation work through the sub-tasks.

The shared pane 206 also selectively displays information 236 associated with various of the operator sub-tasks 216-3, 216-4. This information may be generated in real-time, depending upon the information the operator 110 may need to execute and completed the sub-task. In the depicted embodiment, the displayed information 236 includes optional courses of action (e.g., Option A and Option B), and various informational feedback associated with each option to support operator review of each option, and selection of one of the options.

The system described herein includes a display device that provides feedback regarding the division of automated and operator tasks. It additionally supports shared task execution, and displays the progress of operator, automatic, and shared tasks. The information that is described above as being displayed on the display device 106 is merely exemplary of one embodiment, and the system is not limited to the specifically described information. The system may be configured, in some embodiments, to not display some of the above-described information. The system may also be configured, in some embodiments, to display information in addition to that which was described above.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth herein.

What is claimed is:

1. An adaptive system, comprising:
    a display device coupled to receive image rendering display commands and configured, upon receipt thereof, to render images; and
    a processor in operable communication with the display device, the processor configured to at least selectively supply image rendering display commands to the display device that cause the display device to simultaneously render an operator pane, an automation pane, and a shared pane, wherein:
        the operator pane displays one or more tasks that have been allocated for execution by a human operator,
        the automation pane displays one or more tasks that have been allocated for execution by automation, and
        the shared pane displays one or more tasks that have been allocated for execution by both automation and a human operator.

2. The system of claim 1, wherein the processor is adapted to receive data representative of one or more of operator state, aircraft state, and aircraft mission, and is configured, upon receipt thereof, to adaptively and dynamically allocate various tasks to be displayed in the operator pane, the automation pane, and the shared pane.

3. The system of claim 1, wherein each of the one or more tasks that are displayed in the operator pane, the automation pane, and the shared pane are displayed in a predetermined order.

4. The system of claim 1, wherein the shared pane is rendered between the operator pane and the automation pane.

5. The system of claim 1, wherein each of the operator pane, the automation pane, and the shared pane further display information representative of which of the one or more tasks that have been allocated thereto are currently being executed.

6. The system of claim 1, wherein each of the operator pane, the automation pane, and the shared pane further display information representative of which of the one or more tasks that have been allocated thereto are currently pending.

7. The system of claim 1, wherein each of the operator pane, the automation pane, and the shared pane further display information representative of which of the one or more tasks that have been allocated thereto have been completed.

8. The system of claim 1, wherein each of the operator pane, the automation pane, and the shared pane selectively display a progress indicator associated with the one or more tasks that have been allocated thereto, each progress indicator providing feedback regarding task completion.

9. The system of claim 1, wherein:
    at least selected ones of the one or more tasks that are displayed in the operator pane, the automation pane, and the shared pane have sub-tasks associated therewith; and
    each of the operator pane, the automation pane, and the shared pane further display information representative of which of the sub-tasks associated with the one or more tasks that have been allocated thereto have been completed.

10. The system of claim 9, wherein at least the operator pane further displays one or more parameters associated with the sub-tasks that have been completed.

11. The system of claim 9, wherein at least the operator pane further selectively displays one or more user-interactive fields adjacent one or more of the sub-tasks.

12. The system of claim 9, wherein at least the shared pane further displays which sub-tasks are executed by automation and which sub-tasks are executed by a human operator.

13. The system of claim 1, wherein:
the operator pane selectively displays a task transfer icon at least proximate to one of the tasks that is displayed in the operator pane; and
the processor is further configured, in response to an operator selecting the task transfer icon, to change the task allocation to execution by either automation or by both automation and human operator.

14. The system of claim 1, wherein:
the automation pane selectively displays a task transfer icon at least proximate to one of the tasks that is displayed in the automation pane; and
the processor is further configured, in response to an operator selecting the task transfer icon, to change the task allocation to execution by either human operator or by both automation and human operator.

15. An adaptive system, comprising:
a display device coupled to receive image rendering display commands and configured, upon receipt thereof, to render images; and
a processor in operable communication with the display device, the processor configured to at least selectively supply image rendering display commands to the display device that cause the display device to simultaneously render an operator pane, an automation pane, and a shared pane, wherein:
the operator pane displays one or more tasks that have been allocated for execution by a human operator,
the automation pane displays one or more tasks that have been allocated for execution by automation,
the shared pane is rendered between the operator pane and the automation pane and displays one or more tasks that have been allocated for execution by both automation and a human operator, and
the processor is further adapted to receive data representative of one or more of operator state, aircraft state, and aircraft mission, and is configured, upon receipt thereof, to adaptively and dynamically allocate various tasks to be displayed in the operator pane, the automation pane, and the shared pane.

16. The system of claim 15, wherein each of the operator pane, the automation pane, and the shared pane further display information representative of which of the one or more tasks that have been allocated thereto are currently being executed, information representative of which of the one or more tasks that have been allocated thereto are currently pending, and information representative of which of the one or more tasks that have been allocated thereto have been completed.

17. The system of claim 15, wherein:
the operator pane selectively displays a task transfer icon at least proximate one of the tasks that is displayed in the operator pane; and
the processor is further configured, in response to an operator selecting the task transfer icon, to change the task allocation to execution by either automation or by both automation and human operator.

18. The system of claim 15, wherein:
the automation pane selectively displays a task transfer icon at least proximate one of the tasks that is displayed in the automation pane; and
the processor is further configured, in response to an operator selecting the task transfer icon, to change the task allocation to execution by either human operator or by both automation and human operator.

19. An adaptive system, comprising:
a display device coupled to receive image rendering display commands and configured, upon receipt thereof, to render images; and
a processor in operable communication with the display device, the processor configured to at least selectively supply image rendering display commands to the display device that cause the display device to simultaneously render an operator pane, an automation pane, and a shared pane, wherein:
the operator pane displays one or more tasks that have been allocated for execution by a human operator,
the automation pane displays one or more tasks that have been allocated for execution by automation,
the shared pane is rendered between the operator pane and the automation pane and displays one or more tasks that have been allocated for execution by both automation and a human operator,
the processor is further adapted to receive data representative of one or more of operator state, aircraft state, and aircraft mission, and is configured, upon receipt thereof, to adaptively and dynamically allocate various tasks to be displayed in the operator pane, the automation pane, and the shared pane, and
each of the one or more tasks that are displayed in the operator pane, the automation pane, and the shared pane are displayed in a predetermined order.

* * * * *